(12) United States Patent
Katriniok et al.

(10) Patent No.: US 12,342,222 B2
(45) Date of Patent: Jun. 24, 2025

(54) METHOD FOR SELECTING DATA PACKAGES BASED ON PRIORITY DURING VEHICLE-TO-VEHICLE COMMUNICATIONS

(71) Applicant: FORD GLOBAL TECHNOLOGIES, LLC, Dearborn, MI (US)

(72) Inventors: Alexander Katriniok, Aachen (DE); Felix Reimer, Aachen (DE); Hamed Asadi, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 17/954,921

(22) Filed: Sep. 28, 2022

(65) Prior Publication Data
US 2023/0110895 A1    Apr. 13, 2023

(30) Foreign Application Priority Data

Oct. 8, 2021   (EP) ..................... 21201562

(51) Int. Cl.
*H04W 28/12*   (2009.01)
*H04W 28/08*   (2023.01)

(52) U.S. Cl.
CPC ....... *H04W 28/12* (2013.01); *H04W 28/0942* (2020.05)

(58) Field of Classification Search
CPC ... H04W 28/12; H04W 28/0942; H04W 4/44; H04W 4/40; H04W 4/023; H04W 4/025; H04W 4/026; H04W 4/027; H04W 4/38; H04W 4/46; H04W 4/48; H04W 4/70; H04W 4/90; H04W 92/18; G08G 1/162; H04L 47/24; H04L 47/50; H04L 67/12
See application file for complete search history.

(56) References Cited

U.S. PATENT DOCUMENTS

| | | | |
|---|---|---|---|
| 8,742,987 B2 | 6/2014 | Bai et al. | |
| 8,923,147 B2 | 12/2014 | Krishnaswamy et al. | |
| 10,112,595 B2 | 10/2018 | Naserian et al. | |
| 10,475,344 B2 | 11/2019 | Stinnett et al. | |
| 2015/0138975 A1* | 5/2015 | Gotz | G08G 1/093 370/235 |
| 2020/0059813 A1 | 2/2020 | Park et al. | |
| 2021/0266867 A1 | 8/2021 | Das et al. | |

OTHER PUBLICATIONS

European Search Report for European Application No. EP 21201562. 2, Completed by the European Patent Office, Dated Mar. 18, 2022, 12 pages.

* cited by examiner

*Primary Examiner* — Mohammad S Anwar
(74) *Attorney, Agent, or Firm* — Joseph Zane; Brooks Kushman P.C.

(57) ABSTRACT

Selecting data packages received by a host device is provided. The host device receives a number of N data packages. For each data package of the N data packages: a prioritized data package parameter is calculated. The data packages are sorted according to a predetermined sorting-scheme considering at least prioritized data package parameters. A number of M data packages are down-selected from the N data packages, wherein M<N. The one or more of the down-selected M data packages are processed. Accordingly, hardware and software requirements of the host device may be reduced due to a reduced computational complexity.

20 Claims, 5 Drawing Sheets

METHOD FOR SELECTING DATA PACKAGES BASED ON PRIORITY DURING VEHICLE-TO-VEHICLE COMMUNICATIONS

CROSS-REFERENCE TO RELATED APPLICATIONS

This application claims foreign priority benefits under 35 U.S.C. § 119 (a)-(d) to EP Application Serial No. 21201562.2 filed Oct. 8, 2021, which is hereby incorporated by reference in its entirety.

TECHNICAL FIELD

The present disclosure relates to a method for selecting data packages received by a host device, the method comprising the following operations: the host device receiving a number of N data packages, for each data package of the N data packages: calculating a prioritized data package parameter, optionally: for each of the N data packages determining a priority rank based on the prioritized data package parameters, sorting the data packages according to a predetermined sorting-scheme considering the prioritized data package parameters or optionally the priority ranks, down-selecting a number of M data packages from the N data packages, wherein M<N, processing one or more of the down-selected data packages. Additionally, the disclosure relates to a system for executing said method.

BACKGROUND

Vehicle-to-vehicle (V2V) communications may be understood as specific case of vehicle-to-everything (V2X) communication. Instead of communication between vehicles, V2X may be understood as communication between vehicles and infrastructure-units (being located external, in particular stationary or mobile, to the vehicle), so called V2I communication. Also, communication between vehicles and other traffic-participants (such as pedestrians, so called V2P communication), may be understood as V2X communication.

V2V communication systems enable to exchange information (and da-ta) between vehicles (e. g. between a host vehicle and one or more remote vehicle(s)). Such an exchange of information and data is often based on wireless signal transmission. In addition to data exchange, vehicle-to-vehicle communication may be employed to notify a driver of traffic situations. Within vehicle-to-vehicle communication, each vehicle transmits (sends) information about itself to other vehicles, allowing nearby vehicles to use this information and, for example, to adapt active vehicle systems in the event of an impending accident. By using V2V communication it is-amongst others-possible to exchange data regarding the position, velocity and acceleration of vehicles. Said information may be transmitted by way of messages (data packages) including information about position, driving speed, driving direction or the like.

To make use of V2X, in particular V2V, communication, vehicles need to be equipped with appropriate antenna setups as well as telematics control units (TCUs) that are able to process incoming signals/messages.

SUMMARY

Focusing on the particular case of vehicle-to-vehicle (V2V) communication, the TCU of a vehicle (so called host vehicle) periodically receives a certain number of V2V status messages from other equipped vehicles (so called remote vehicles (RVs)), which contain-amongst others-information about the RV's position, velocity, heading, etc. In the US and China, e.g, such a message is referred to as a BSM, in other regions of the world this message may have different names (e. g., CAM and DENM in Europe). When receiving such a region dependent message, it may be converted into a region independent representation which contains the most relevant status information of the RV-herein referred to as converted target (representing a data package). These converted targets are maintained in a list of N targets. The list of targets may then be made available to driver assist features that may either reside on the TCU or any other electronic control unit (ECU). In the latter case, an Ethernet or Controller Area Network (CAN) interface is required to distribute the data to other ECUs.

Only a limited number of targets (which may be understood as data packages) can sufficiently be processed within the driver assist features due to computational limitations. The same applies to the transmission of data via physical interface due to bandwidth limitations. The same problem may arise in cases of in-vehicle data-processing or in-vehicle data-transmission, for example, when refer-ring to data provided by in-vehicle sensing units that are being collected, processed and/or transmitted in/to an ECU of the vehicle. For example, such a case may be applied to radar-, camera-or Lidar-ECUs. Moreover, such problems may arise within vehicle-to-infrastructure (V2I) or vehicle-to-pedestrian (V2P) communication. To address these problems there are several methods and systems known from the state of the art, which are directed to data-selection in general. However, these data-selection methods are often based on insufficient and inflexible selection schemes For this reason, it is an object of the present disclosure to provide an alternative method and system for data-selection that first reduces computational complexity and bandwidth requirements (e. g. Ethernet, CAN) allowing to reduce hard- and software requirements and second allows for flexible adaption to different application-cases.

Said object is achieved by a method according to claim 1 and a system according to claim 15. The disclosure first relates to a method for selecting data packages received by a host device, the method comprising the following operations: the host device receiving a number of N data packages, for each data package of the N data packages: calculating a prioritized data package parameter, optionally: for each of the N data packages determining a priority rank based on the prioritized data package parameters, sorting the data packages according to a predetermined sorting-scheme considering the prioritized data package parameters or optionally the priority ranks, down-selecting a number of M data packages from the N data packages, wherein M<N, processing one or more of the down-selected data packages. It is to be noted, that said method may be a computer-implemented method.

A "data package" may be understood as any data (e. g. a closed data unit), which can be received by a receiving unit (in this case a host device). Thus a "data package" might refer to packed data or to data being not packed. The data package may comprise a single data element or multiple data elements. The data elements may comprise textual information, one or more letters, one or more numbers, and/or one or more graphical elements or the like. A data package may have a well-defined length and shape. Any single signal (e. g. an electrical signal), assemblies of multiple signals (e. g. a signal-train), may be understood as data package. The data package may refer to raw data (e. g. of measured data) and (pre) processed data. The data package may also be a message. The "data package" may be transmitted (and received) analogous or digital.

The "host device" may be any hardware device that is configured to execute at least operation a. of the abovementioned method, so the host device is at least configured to receive the number of N data packages. The host device may e. g. be installed in a vehicle (e. g. a host vehicle), where the host device may be a control unit or part of a control unit, e. g. a TCU. The host device may be configured to also execute operations b.-f. of the proposed method. Thus, the host device may comprise dedicated means for executing operations a.-f. However, the host device may also be part of an ECU or a sensing unit (both e.g. being part of a host vehicle).

Within operation a., the host device receives a number of N data packages. The number N may correlate to a number of data packages transmitted to the host device by a single transmitting unit or by multiple transmitting (sending) units, the transmitting unit(s) may e.g. be remote device(s) or sensing unit(s). Referring to an example where the host device is installed in a host vehicle, the N data packages may be transmitted to the host device by transmitting (sending) units located in remote vehicles. Each of the remote vehicles may transmit (send) a single data package or multiple data packages to the host device of the host vehicle. Referring to the same example, the N data packages may also be transmitted to the host device (of the host vehicle) by sensing units (e.g. radar, lidar, camera etc.). The host vehicle may be equipped with multiple sensing units of the same type (e. g. multiple Radar units) or different type (e.g. a radar unit and a camera). The number of N data packages may be transmitted to the host device by a single sensing unit or multiple sensing units.

The term "receiving" may be understood as receiving the data packages by way of wireless or wired signal transmission. To receive data packages, the host device comprises a suitable receiving unit or a receiving interface to receive data packages.

Within operation b. for each of the N data packages a prioritized data package parameter is calculated. Thus, the host device, a data-processing unit of the host device or a data-processing unit being in data connection with the host device calculates the prioritized data package parameter. The calculation may be performed by software, an algorithm, a routine, or the like, wherein the calculation is operated automatically. However, the software, algorithm, routine, or the like may be programmed or updated on demand or regularly.

In operation c. a priority rank may optionally be determined in a separate operation. In this context "determining" may be understood as an operation referring to assigning a priority rank to a calculated prioritized data package parameter. Assigning a priority rank may be operated under consideration of given priority criteria (e. g. a low value of a prioritized data package parameter may be assigned to a low priority or high priority, or a high value of a prioritized data package parameter may be assigned to a low priority or high priority). Operation c. may be operated automatically, in particular based on software, an algorithm, a routine, or the like. Operations b. and c. may be operated with the same software, algorithm, routine or the like. In case of using different software, algorithms, routines or the like for steps b. and c. the software, algorithms, routines or the like may interact with each other.

However, the method according to the invention may sort the data packages directly based on the prioritized data package parameters (without an additional operation of assigning a priority rank). In this case the prioritized data package parameters as such define different priorities (e. g. highest priority, second highest priority, lowest priority or the like). This means that the prioritized data package parameters express a "priority rank" by their specific values. This operation may be operated automatically, in particular based on software, an algorithm, a routine, or the like.

In operation d., the data packages are sorted according to a predetermined sorting scheme considering the prioritized data package parameters or optionally the priority ranks. The sorting scheme may sort the data packages for example in an ascending or descending order with respect to the prioritized data package parameters or optionally the priority ranks. Operation d. may be operated automatically, in particular based on software, an algorithm, a routine, or the like. Operations b., c. and d. may be operated with the same software, algorithm, routine or the like. In case of using different software, algorithms, routines or the like for operations b., c. and d., the software, algorithms, routines or the like may interact with each other.

In operation e., a number of M data packages is down-selected from the N data packages. Down-selection means that a partial quantity is selected from a larger quantity, in the present case a smaller number of M data packages is selected from a larger number of N data packages. Depending on the applied software, algorithm, routine or the like, or depending on the use case, the number M of selected data packages may vary. The variation may also depend on the absolute number of received data packages. The number of M down-selected data packages may further depend on the calculation capacity (or power) of the unit operating operation e. (e. g. the host device, a data processing unit of the host device or a data processing unit being in data connection with the host device). In case that the host device is installed in a host vehicle and the data packages are transmitted from remote devices of remote vehicles (or other remote objects) to the host device, the number of down-selected data packages may depend on an actual traffic situation, which may be considered by using pre-defined selection criteria for different traffic situations. Considering e.g. a sorted list of data packages (which may include data packages sorted in an ascending/descending order according to their corresponding prioritized data package parameters or priority ranks) down-selection may be understood as selecting first or last elements M (e.g data packages) of the list which has been sorted in ascending/descending order.

In operation f. one or more of the down-selected data packages are processed. Processing denotes that the down-selected data packages may be transmitted to further units (e.g. ECUs in a vehicle) or may be processed in a sense of being used to extract information or to analyze the data packages for follow-up operations.

It is to be noted, that operation e., refers to the term "down-selection" as a fixed number M<N data packages is selected from a number of N data packages, so the number of data packages is reduced (down-selected). The operations a.-e. may be employed on the same device, e.g. the host device. Also, the operations a.-e. may be operated by the same software, algorithm, routine, or the like. To be implemented on the host device (which might be a TCU), said down-selection software, algorithm, routine, or the like must exhibit low computational complexity. For this reason, the down-selection criteria are usually based on simple quantities. In case of V2V applications, the down-selection criteria may be based on criteria such as range (i.e., Euclidean distance between a host vehicle and remote vehicle) and range rate (i.e., first time-derivative of the range). The down-selection criteria are adaptable to different use cases and needs.

Further embodiments of the disclosure are given in the subclaims and are described in more detail in the following part of the description.

According to a first embodiment of a method according to the disclosure, the data packages are transmitted to the host device from one or more remote device(s) by way of device-to-device (D2D) signal-transmission. As mentioned above, D2D signal-transmission may refer to V2V, V2I or V2P signal-transmission. A "remote device" is preferably located external (i.e. in a distance) to the host device. The data packages transmitted by the one or more remote device(s) may relate to position or location data (e.g. global positioning system (GPS) data, also other positioning systems may be suitable, for instance the Galileo system) of the remote device(s). From such position or location data, a range to the host device may be calculated, thereby considering the position or location data of the host device as well. By this information, a range rate of the remote device(s) may be determined (in case the remote device(s) is/are moving).

According to further embodiment of a method according to the disclosure, the host device is part of a host vehicle, and the one or more remote device(s) are part of remote vehicles or other remote objects.

In case that the host device is part of a host vehicle and the one or more remote device(s) are part of remote vehicles or other remote objects (such as infrastructure or pedestrians), the signal-transmission is based on V2V, V2I or V2P communication. In such a case, data packages are being received by the host device (as part of the host vehicle). The data packages may be transmitted from remote devices being located in a predefined range to the host vehicle. The host device and the remote device(s) may be equipped with suitable means for determining the range between each other. The means may relate to sensing units (e. g. radar, lidar or cameras) or may use location data (e. g. GPS data) to determine the range. In context of the disclosure the Euclidean distance between two reference points (e.g. the host vehicle and a remote device) is defined as "range". The range may be calculated in a suitable unit of the host vehicle (e.g. the TCU or directly by the sensing units). When applying the disclosure to said embodiment, it is possible to select relevant data packages and thus to select relevant remote devices (e.g. as part of remote vehicles) in the vicinity of the host device by considering multiple selection criteria. The selection criteria may be the range and the range rate, as discussed below.

According to a further embodiment of a method according to the disclosure, the host device is part of a host vehicle, wherein the data packages are transmitted to the host device by one or more functional unit(s), in particular sensing unit(s), of the host vehicle. Modern vehicles are often equipped with a variety of sensing units, e. g. radar, lidar and/or camera(s). These sensing units (or data measured by these sensing units) may support drive assist features. Therefore, parameters such as range (Euclidian distance) between the host vehicle and a remote device (e. g. as part of a remote vehicle) may also be determined by using one or more sensing unit(s) of the remote vehicle or based on data measured with such units. Data measured by the sensing unit(s) of the host vehicle may be pre-processed or processed in an ECU (assigned to a specific sensing unit) and then transmitted by way of data packages e. g. to a TCU or ECU as host device. The same may apply to raw data measured by the sensing units. In such a use case, it is crucial to determine which of the transmitted data packages is relevant in an actual driving or traffic situation. To reduce computational complexity, the down-selection procedure may be helpful also in such a case. In case of raw data (or data not being finally processed by the respective sensing unit), the data (or data packages) may be transmitted to an ECU, where the data-processing is continued or performed.

According to further embodiment of a method according to the disclosure, in operation b. the prioritized data package parameter for each data package is calculated from on a ratio of a first data package associated parameter, and a priority factor.

The first data package associated parameter may be derived from data of the respective data package or may be directly provided by the data package. Operation b. may be operated by the host device (which may be a TCU of a host vehicle).

According to a further embodiment of a method according to the disclosure, the priority factor is defined as a predefined function of a second data package associated parameter or a predefined function of a number of data package associated parameters, in particular a number of first or second data package associated parameters. The second data package associated parameter may be derived from the first data package associated parameter or may be (mathematically) related to the first data package associated parameter. For instance, the second data package associated parameter may be a first time-derivative of the first data package associated parameter.

According to a further embodiment of a method according to the disclosure, in operation d. data packages are sorted in an ascending or descending order with respect to the prioritized data package parameters or the priority ranks. Choosing an ascending or descending order may be dependent on the specific use case where the proposed method is applied to. According to further embodiments of a method according to the disclosure, in operation e. M data packages with the highest or lowest prioritized data package parameters or priority ranks are down-selected.

According to a further embodiment of a method according to the disclosure, the processing of the down-selected data packages in operation f. is associated with transmitting one or more of the down-selected data packages from the host device to one or more receiving unit(s) and/or processing the down-selected data packages in the host device.

The one or more receiving unit(s) may refer to ECUs being implemented in a host vehicle. When one or more of the down-selected data packages are transmitted to such (a) receiving unit(s), the down-selected data packages may be processed directly in a unit (e.g. an ECU) that comprises the receiving unit(s). Processing may refer to a computational analysis. Also, the down-selected data packages may be directly processed in the host device, which may be refer to a further computational analysis.

According to a further embodiment of a method according to the disclosure, the prioritized data package parameter is a prioritized range between the host vehicle and a remote vehicle, wherein the prioritized range is calculated from a ratio of a range between the host vehicle and the remote vehicle as the first data package associated parameter, and a predefined function of the range rate as second data package associated parameter.

In the following, the calculation of the prioritized range is explained in more detail with respect to a use case where each data package received by the host device of a host vehicle refers to a message transmitted by a remote device of a remote vehicle. The "range" may be defined as the Euclidian distance between two dedicated reference points of the host vehicle and the remote device (e. g. being part of a remote vehicle). The "range rate" may defined as the first time derivative of the range.

The prioritized range may be calculated from a ratio of the range and the priority factor (a predefined function of a second data package associated parameter). The priority factor may be defined as a function of the range rate. Each remote device (or remote vehicle) may have a prioritized range assigned to it. With said calculation method of the prioritized range the remote devices (or remote vehicles) may be sorted based on their prioritized range. The prioritized ranges may then optionally be assigned to priority ranks which may then be sorted (the sorting may also be based on the values of the prioritized data package parameters as such), e.g. in an ascending order. This means that the lower the prioritized range is, the higher the priority will be.

The priority factor (PF) may be determined with help of a prioritization map (a 2D or 3D plot of dedicated variables). The prioritization map shall be described by prioritization-curve-point-number points. Each point $P_i$ with $1 \leq i \leq$ PrioritizationCurvePointNumber shall be defined as pair of the range rate value $P_{i,RR}$ and the corresponding priority factor value $P_{i,PF}$ with $P_{i,PF} > 0$. The points shall be sorted in ascending order by their range rate value $P_{i,RR}$ and the indices shall be assigned accordingly: $P_{1,RR} \leq P_{2,RR} \leq \ldots \leq P_{prioritization\text{-}curve\text{-}point\text{-}number,RR}$. The priority factor of a remote vehicle shall be calculated by linear interpolation between the given points. If the range rate of a remote vehicle is greater than $P_{prioritization\text{-}curve\text{-}point\text{-}number,RR}$, the priority factor shall be set to $P_{prioritization\text{-}curve\text{-}point\text{-}number,PF}$. If the range rate of a remote vehicle is smaller than $P_{1,RR}$, the priority factor shall be set to $P_{1,PF}$.

It is to be noted that the method is not limited to the parameter range and range rate, much more these quantities may be substituted by others such as steering angle, relative heading depending on the use case or driving scenario. The prioritization map is as well not limited to piecewise linear functions, and it could also be defined as multivariate function to accommodate different scenarios.

It is to be noted that the down-selection provided by the proposed method may also be based on single variables instead of a ratio. These single variables (selection criteria) may be: range, range Rate or TL. The variables range and range rate have been defined above. TL is defined as quotient of range and range rate. For each of the three criteria, a lower value indicates a higher priority. The items may be sorted in ascending order based on the criterion and the first M data packages with the lowest values are selected.

When performing the down-selection of remote vehicles based on the range only, remote vehicles being close to the host vehicle are preferred. The velocity and moving direction of the remote vehicles are not considered. This methodology might be disadvantageous for a use case of a driver assistance function such as FCW assist, e.g.: a close remote vehicle nr. 1 with a similar velocity is preferred to remote vehicle nr. 2 with a higher range and a high negative range rate. However, remote vehicle nr. 2 would have a higher relevance to the driver assistance function.

When performing the down-selection of remote vehicles based on the range rate only, remote vehicles with high negative range rate values would be preferred independent of their range. Depending on the intended use case or driver assistance function, it could be reasonable to prefer remote vehicles with lower range values to remote vehicles with slightly lower range rate values but higher range.

The quotient of range and range rate, also referred to as TL, combines the variables range rate and range to address the issues described above. However, the calculation of TL introduces new issues. If a remote vehicle and host vehicle are moving in the same direction and at the same velocity (range rate=0), TL provides no valid output, as it includes a division by zero. For remote vehicles with range rate values greater than zero, TL does not provide meaningful results. Comparing two RVs with the same Range, higher positive range-rate values result in lower TL values and a higher priority. High positive range-rate values indicate that the RV is moving away from the host vehicle (HV) at a higher velocity. Therefore, a lower priority should be assigned to those RVs. The change of the range-Rate's sign causes this behavior.

Compared to the three described approaches (down-selection based on range, range rate or TL), the above-described approach considering a ratio of the range and priority factor (function of the range rate) combines both range and range-rate to address the described issues. Compared to the TL approach, singularities are evaded by defining the priority factor>0. Therefore, the prioritized range is defined for all range and range rate values. Because of this definition, the change of the Range-Rate's sign does not cause inconsistent behavior. In addition, via parameterization, the weight of the range rate relative to the range can be changed, depending on range rate value, e. g. the priority factor may be limited for high negative range rate values to reduce the priority of oncoming remote vehicles, or the priority factor may be increased for remote vehicles with a small positive range rate to increase the priority of a remote vehicle with similar velocity to the host vehicle-such as leading remote vehicles.

Via parameterization of the prioritization map, the prioritized range may be configured to be equal to range–priority factor=1 independent of the range rate–or equal to TL –priority factor=range rate.

According to a further embodiment of a method according to the disclosure, the host device comprises a communication unit for executing operations a. and/or f. of claim 1 and a data processing unit for executing operations b.-e. and optionally operation f. of claim 1.

The "communication unit" may be suitable for wireless and/or wired signal transmission (receiving and sending data such as the mentioned data packages). The communication unit may be part of a TCU as host device of a host vehicle. In this case the communication unit may comprise a dedicated interface to enable a connection via CAN, Ethernet etc. to ECUs of the host vehicle. A wireless connection may for example be based on Global System for Mobile Communication (GSM), General Packet Radio Service (GPRS), Wi-Fi, WiMax, LTE, 3G, 4G, 5G or any other suitable communication standard. The communication unit may be both suitable for wireless and wired signal transmissions (receiving, sending). However, the communication unit may be configured for wireless or wired signal transmission only. The "data processing unit" may be any suitable unit to perform said method operations, for instance a processor, computer, a (micro) controller or the like.

According to a further embodiment of a method according to the disclosure, the host device is a control unit, in particular a telematics control unit, of the host vehicle. A TCU refers to an embedded system on board of a vehicle that wirelessly connects the vehicle for example to cloud services or other remote vehicles via dedicated standards. A TCU may collect telemetry data from the vehicle, such as position, speed, engine data etc. These data may be shared with other vehicles and transmitted by way of data packages. A TCU may also comprise means (e. g. an interface) for wired connections (e. g. to ECUs of the vehicle). ECUs refer to embedded systems in automotive electronics that control one or more electrical systems or subsystems of the vehicle. ECUs might be an engine control module, a powertrain control module, transmission control module, brake control module, suspension control module, central control module, central timing module. ECUs may also refer to sensing units of the vehicle such as radar unit(s), lidar unit(s), camera unit(s) or the like.

According to a further embodiment of a method according to the disclosure, the remote devices are being installed in remote vehicles and/or other remote objects. Remote vehicles may be understood as vehicles being located (driving, stopping) in the vicinity of the host vehicle. The distance from the host vehicle that may be defined as "vicinity" may be dependent on the location (e. g. motorway, city road, country road, federal road etc.), the traffic volume or specific traffic situations etc. Other "remote objects" may be understood as stationary or moving objects. A remote object may for example be a pedestrian (or any other person) carrying a remote device (e. g. a portable electronic device such as a smartphone). A stationary remote object may for example be a tollgate, a registration unit, a traffic light, a traffic counting unit, a traffic sign, a speedometer, or any other stationary object.

According to a further embodiment of a method according to the disclosure, the remote devices may be sensed by sensing units being installed in the host vehicle. The term "sensing" may be understood as any recognition (identification) method suitable to recognize (identify) the presence of a remote device. Sensing of a "remote device" may also be understood as indirect recognition (e. g. sensing of a remote vehicle as indicator for the presence of a remote device). Sensing may also be understood in a sense of "measuring". Said sensing units may each be configured to transmit data packages (sensed by the sensing units) to an ECU. Thereby, to each sensing unit a single ECU may be allocated. Also, different sensing units may be allocated to a central ECU. A sensing unit may be any (optionally intelligent) sensor, that may be used to control an operation-procedure of a vehicle or to detect an environmental-or vehicle condition. A sensing unit may also be used to detect information of remote vehicles or other remote objects (being either stationary or mobile), for example range, range rate, direction of movement relative to the host vehicle, movement speed etc. For instance, a sensing unit may be a mass airflow sensor, engine speed sensor, oxygen sensor, rain sensor, spark knock sensor, coolant sensor, a pressure sensor, a temperature sensor, a voltage sensor, a current sensor, a parking sensor, a humidity sensor, a reverse sensor, a camshaft position sensor, a throttle position sensor, a speed sensor or the like. A sensing unit may also be a radar sensor, a lidar sensor, a camera, an ultrasonic sensor, a proximity sensor or the like.

It should generally be noted that the host device (operating the operations according to proposed method according to the disclosure) may be a TCU, ECU (e.g. being in signal connection with a TCU or a sensing unit) or a sensing unit.

The object of the disclosure is also achieved by a system for executing the method according to the disclosure, the system comprising a host device, the host device comprising a communication unit for executing operations a. and/or f. of claim 1 and a data processing unit for executing operations b.-e. and optionally operation f. of claim 1. The host device may be installed in a host vehicle. The proposed system comprises dedicated means for executing the operations of the proposed method, which may be a computer-implemented method. The disclosure may also be directed to a computer-program being installed on a dedicated storage-medium, the computer-program being configured to execute the proposed method. For instance, the computer-program may be installed on the host device. It may also be possible, that the computer-program is operated on an external server or may be cloud-based (in this case the host device being in wireless signal connection with the server or cloud). The disclosure may further be directed to a computer-readable medium comprising said computer-program configured to execute the proposed method.

All aspects described above in relation to the proposed method may also be used to characterize the system proposed with the disclosure and vice-versa.

BRIEF DESCRIPTION OF THE DRAWINGS

The disclosure will now be described in more detail with reference to the appended figures. In the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
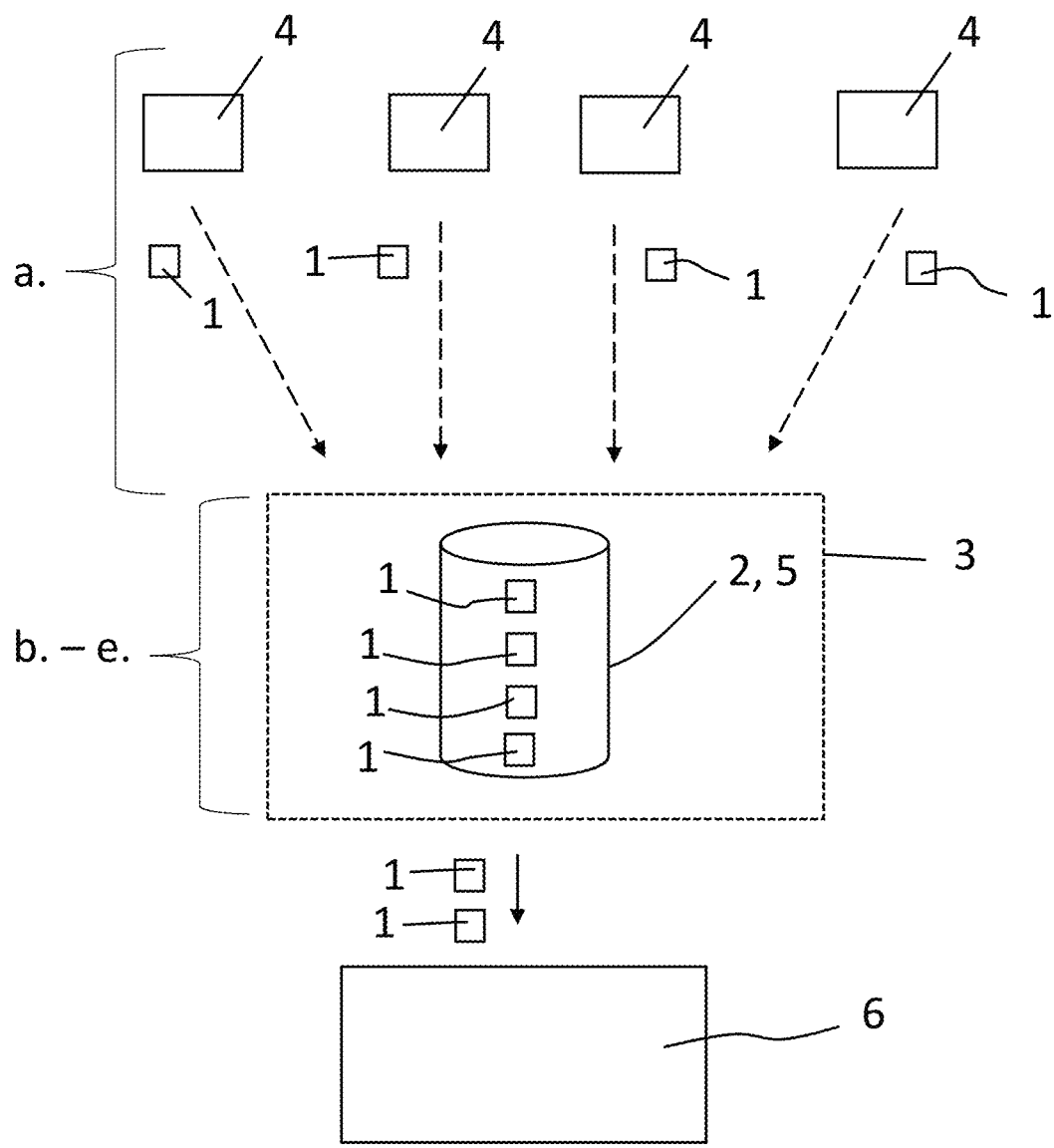
FIG. 1 shows a workflow diagram illustrating the method according to the disclosure.

FIG. 1 shows a method for selecting data packages 1 received by a host device 2. The host device 2 is part of a host vehicle 3 and the data packages are transmitted (send) from remote devices 4 to the host device 2. In the shown example the host device 2 is a TCU 5. The remote devices 4 may be part of remote vehicles (not shown).

The host device 2 may be suitable to be used for V2X communication, in which case the data packages 1 may be messages from remote devices of remote vehicles (V2V), infrastructure (V2I) or pedestrians (V2P). In a first operation a. of the method according to the disclosure N (here four)

data packages 1 are transmitted from the remote devices 4 to the host device 2. The host device 2 receives the N data packages. In an operation b. for each data package 1 of the N data packages 1 a prioritized data package parameter is calculated. In a follow-up operation c. for each of the N data packages 1 a priority rank is determined based on the prioritized data package parameters. In a follow-up operation d the data packages 1 are sorted according to a predetermined sorting-scheme considering the priority ranks. In operation e. M data packages 1 are down-selected from the N data packages 1, wherein M<N. Operations b-e. are carried-out by the host device 2. Finally, one or more of the M down-selected data packages 1 are processed, e. g. by transmitting the down-selected data packages 1 (here a number of two data packages 1) to an ECU 6. The ECU 6 may be part of the host vehicle 3. Alternatively, the processing may be carried-out directly in the host device 2.

The data packages 1 may also be transmitted (send) to the host device 2 (which may be an ECU or TCU 5) by sensing units (which may be installed in the host vehicle 3 as well). Also, the sensing units as such or ECUs allocated to the sensing units may act as host device 2. The sensing units may be radar, lidar or camera units. With these sensing units information about the environment, e.g. a distance (range) of other vehicles, may be determined. Raw-measurement data may be transmitted to the host device 2 by the sensing units. The raw-measurement data may then be pre-processed and filtered by the host device 2. Then M data packages 1 are down-selected from the initial number of N data packages 1. Said down-selected data packages 1 may then be processed, e. g. by further transmitting these data packages 1 to ECUs 6 of the host vehicle 3 (e. g. via CAN, Ethernet etc.) or by processing the down-selected data packages 1 on the host device 2.

Figure 2:
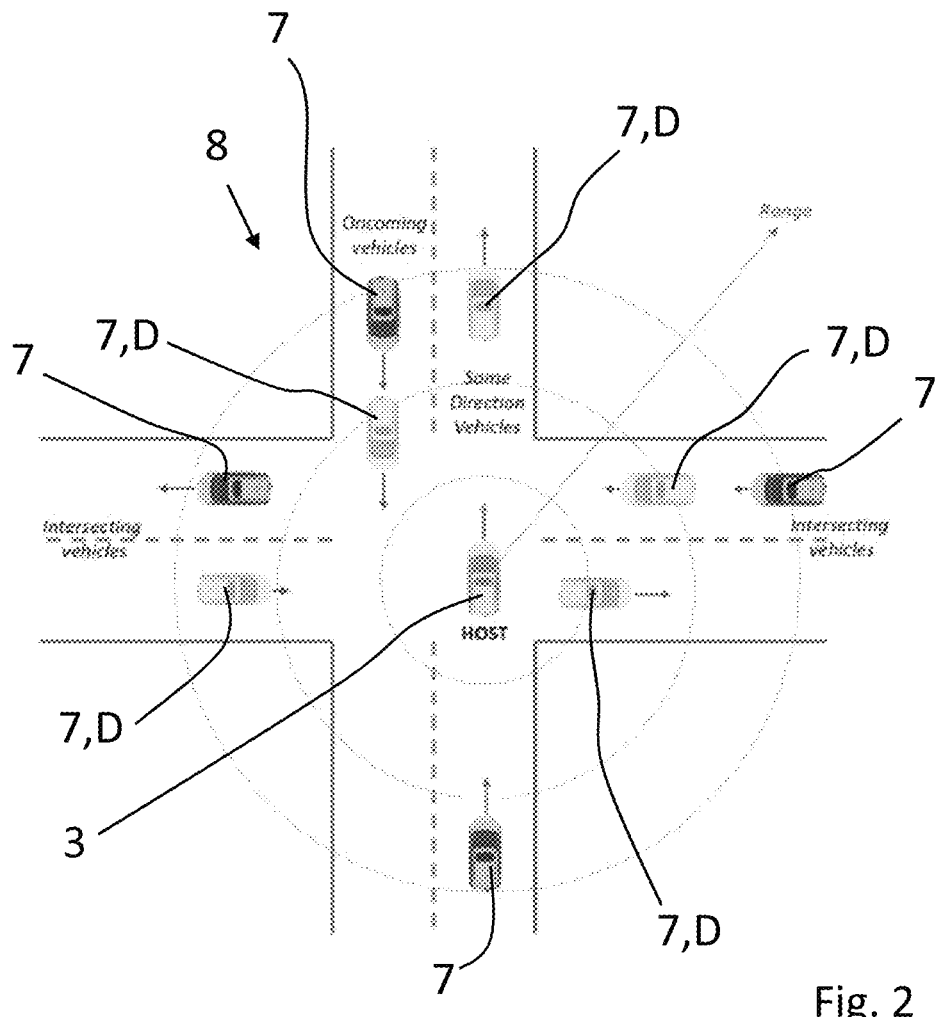
FIG. 2 shows an intersection scenario where the disclosed approach may be applied.

Turning to FIG. 2, a potential application of the present disclosure is shown with respect to the example of V2V communication. An intersection scenario (crossroad 8) with nine remote vehicles 7 and a single host vehicle 3 is illustrated. Only five remote vehicles 7 of nine remote vehicles 7 are down-selected by the proposed method (the down-selected remote vehicles 7 are additionally indicated by the reference sign D). The down-selection has been carried-out based on nine data packages 1 transmitted to a host device 2 of the host vehicle 3 by remote devices 4 of the remote vehicles 7. The down-selected data packages 1 (which can be messages) are processed by transmitting them by the host device 2 (which may be a TCU 5) via a physical interface to one or more ECUs 6 (of the host vehicle 3) where a driver assist feature may be run. FIG. 2 shows that remote vehicles 7 are down-selected which may be of higher relevance with respect to potential obstacle interactions (e. g. vehicles crossing the driving direction of the host vehicle 3 or oncoming remote vehicles 7).

As outlined before, in operation b. of the proposed method, the prioritized data package parameter for each data package 1 is calculated from a ratio of a first data package associated parameter and a priority factor. The priority factor may be defined as a predefined function of a second data package associated parameter. When the method is employed for instance in the field of V2V communication (as shown in FIG. 2), the prioritized data package parameter may be a prioritized range between the host vehicle 3 and a remote vehicle 7, wherein the prioritized range is calculated from a ratio of a range between the host vehicle 3 and the remote vehicle 7 as the first data package associated parameter, and a predefined function of the range rate as second data package associated parameter.

In the following, the calculation of the prioritized range is explained in more detail with respect to a use case where each data package 1 received by the host device 2 of a host vehicle 3 refers to a message transmitted by a remote device 6 of a remote vehicle 7. The "range" may be defined as the Euclidian distance between two dedicated reference points of the host vehicle 3 and the remote device 6 (e. g. being part of a remote vehicle 7). The "range rate" may be defined as the first time derivative of the range.

Figure 3:
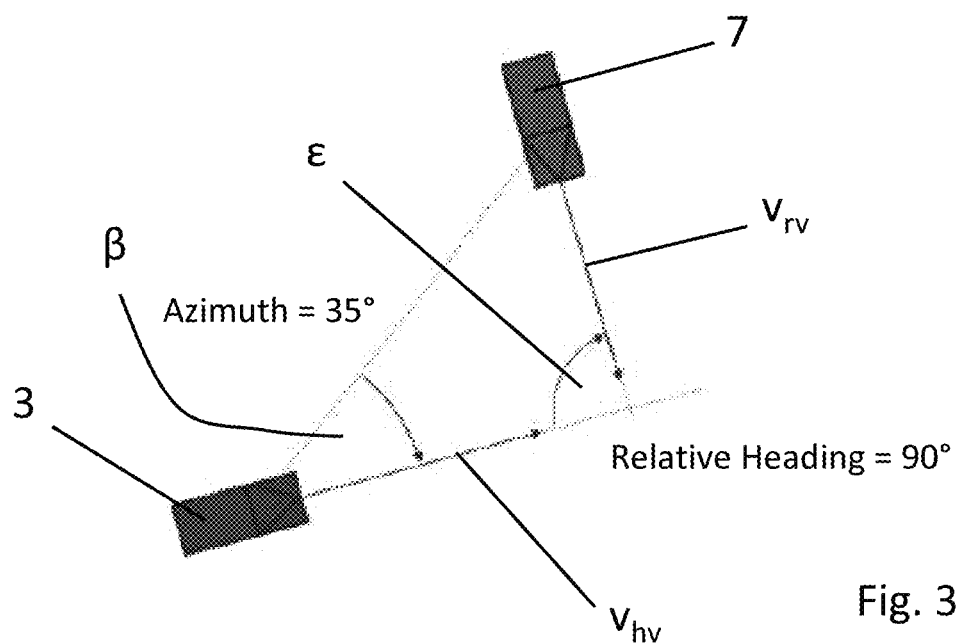
FIG. 3 shows a schematic illustration for calculating a range rate between a host vehicle and remote vehicle.

FIG. 3 shows an exemplary calculation of the range rate referring to a host vehicle 3 and a remote vehicle 7 heading each other by driving in directions angled by 90°. The range rate is calculated by using the following equation:

$$\text{range rate} = vrv \cdot \cos(\beta - \varepsilon) - vhv \cdot \cos(\beta);$$

wherein:
vrv is the velocity of the remote vehicle 7;
vhv is the velocity of the host vehicle 3; and
$\beta$ and $\varepsilon$ are angles as shown in FIG. 3.

The prioritized range may be calculated from a ratio of the range and the priority factor (a predefined function of a second data package associated parameter). The priority factor may be defined as a function of the range rate. Each remote device 4 (or remote vehicle 7) may have a prioritized range assigned to it. With said calculation method of the prioritized range, the remote devices 4 (or remote vehicles 7) may be sorted based on their prioritized range. The prioritized ranges may then optionally be assigned to priority ranks which may then be sorted, c. g. in an ascending order. This means that the lower the prioritized range is, the higher the priority will be. As described before, the sorting may also rely on the values of the prioritized data package parameters as such (e. g. the prioritized ranges).

The priority factor may be determined with help of a prioritization map (a 2D or 3D plot of dedicated variables). The prioritization map shall be described by prioritization-curve-point-number points. Each point Pi with 1≤i≤prioritization-curve-point-number shall be defined as pair of the range rate value Pi, RR and the corresponding priority factor value Pi, PF with Pi, PF>0. The points shall be sorted in ascending order by their range rate value Pi,RR and the indices shall be assigned accordingly: P1, RR SP2, RR≤ . . . ≤Pprioritization-cuve-point-number, RR. The priority factor of a remote vehicle 7 shall be calculated by linear interpolation between the given points. If the range rate of an remote vehicle is greater than Pprioritization-cuve-point-number, RR the priority factor shall be set to Pprioritization-cuve-point-number, PF. If the range rate of an remote vehicle 7 is smaller than P1, RR the priority factor shall be set to P1, PF.

Figure 4:
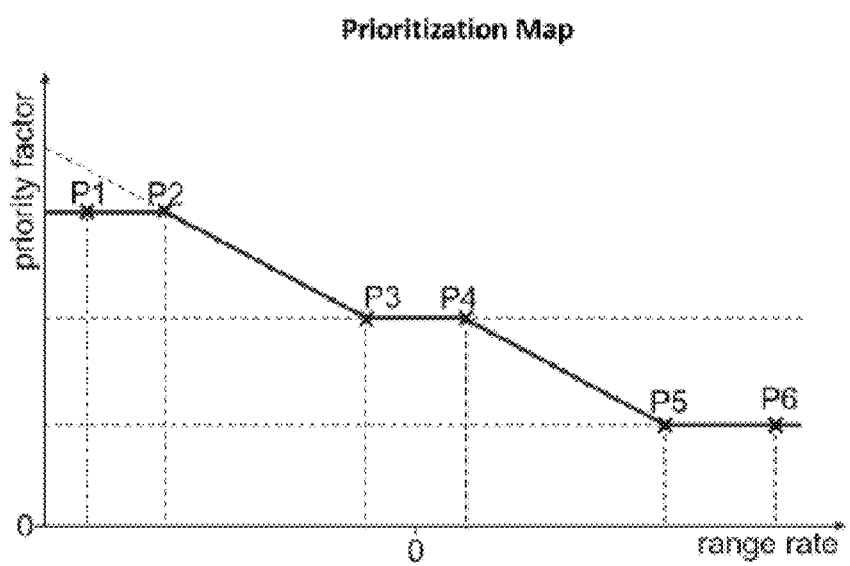
FIG. 4 shows a schematic illustration of a two-dimensional prioritization map.

A typical two-dimensional prioritization map is shown in FIG. 4, where the priority factor is plotted versus the range rate. In this example, the prioritization map is described by six points. P1-P6. The range rate may be positive or negative. A negative range rate is associated with higher priority when compared to a positive range rate.

Figure 5A:
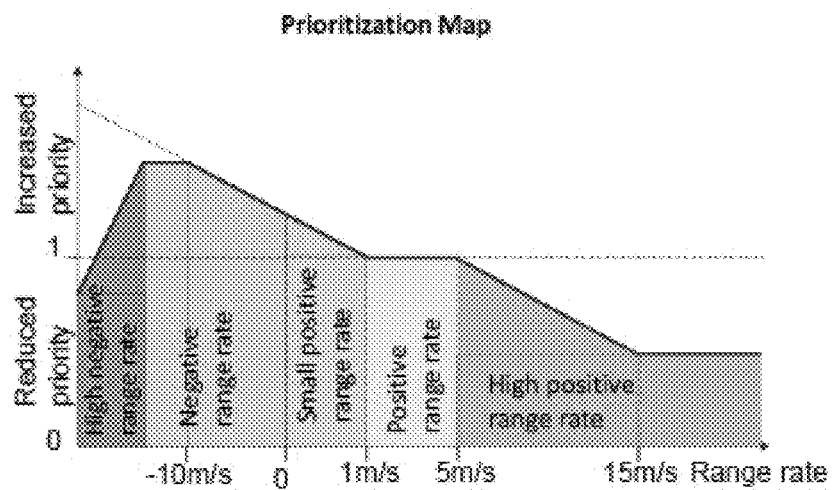
FIG. 5A shows a two-dimensional prioritization map for a use case of the disclosure relating to an electronic emergency brake light assist.
Figure 5B:
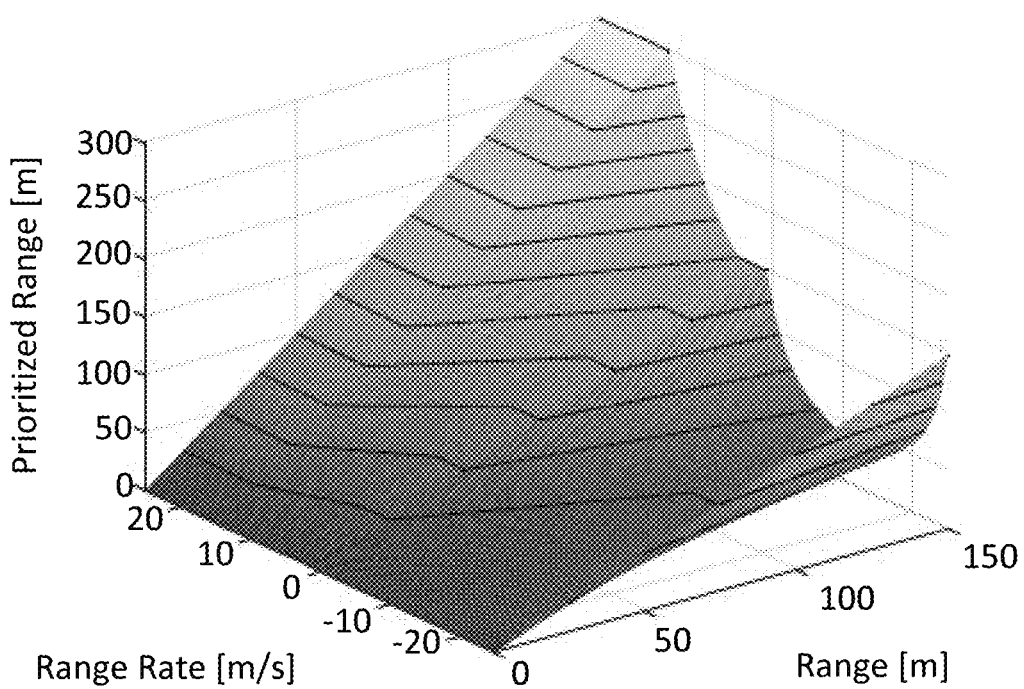
FIG. 5B shows the results of prioritization for the use case of FIG. 5a, wherein the prioritized range=range/prioritization map (range rate)

In the following, the potential and advantages of the present disclosure are described in context of two applications, namely with respect to an electronic emergency brake light assist (EEBLA) and a left turn assist (LTA), both applications related to the field of vehicles. For both applications, a two-dimensional prioritization map (FIGS. 5A, 6A) and a three-dimensional plot showing the results of prioritization (FIGS. 5B, 6B) are shown, wherein FIGS. 5A and 5B refer to the use-case of EEBLA and FIGS. 6A and 6B refer to the use-case of LTA. FIGS. 5B and 6B show the results of prioritization by way of the prioritized range=range/prioritization map (range rate).

An EEBLA may inform the driver of a host vehicle 3 to reduce the possibility of rear-end obstacle interactions, if a leading remote vehicle 7 is in its path or close to its path while performing an emergency braking maneuver. If a remote vehicle 7 performs an emergency braking procedure, it shall transmit this information along with additional data such as position, velocity and orientation via vehicle-to-vehicle messages (data package 1) to surrounding vehicles, specifically to the remote vehicle 3. The host vehicle 3 equipped with EEBLA receives this data package 1, evaluates its relevance and informs the driver, if necessary. In general, those remote vehicles 7 are considered to be relevant, which are ahead, travelling in the same-direction and are in the same or an adjacent lane as the host vehicle 3.

To prioritize received vehicle-to-vehicle messages (data packages 1) for further processing the proposed method according to the disclosure may be used. FIG. 5A shows a possible configuration of a prioritization map for this use-case. It allows assigning different priority levels to remote vehicles 7 dependent on their range rate while guaranteeing a continuous output. The priority of remote vehicles 7 with a high positive range rate is reduced as the distance between the host vehicle 3 and the remote vehicle 7 increases. In an event of emergency braking, the remote vehicle 7 is unlikely to be relevant to EEBLA. The range rate of remote vehicles 7 traveling at the same velocity and in the same direction as the host vehicle 3 have a low negative to a low positive value. For this group of remote vehicles 7, the priority is increased. Such remote vehicles 7 close to the host vehicle 3 may become highly relevant in an event of an emergency braking event. Remote vehicles 7 being approached by the host vehicle 3 are relevant because in an event of an emergency braking a rear-end obstacle interaction could be more likely. Therefore, the priority of remote vehicles 7 is increased with a decreasing range rate. Oncoming remote vehicles 7 are unlikely to be relevant for EEBLA. For this reason, the priority of remote vehicles 7 with a high negative range rate—e.g range rate=−2·vhv—is highly reduced.

The Left-Turn-Assist (LTA) may inform a driver of a host vehicle 3 of oncoming, fast approaching remote vehicles during a left turn to evade obstacle interaction in intersections. Vehicle-to-vehicle messages (data packages 1) including position, orientation and velocity of remote vehicles may be used in addition to vehicle sensors such as radar or camera.

Figure 6A:
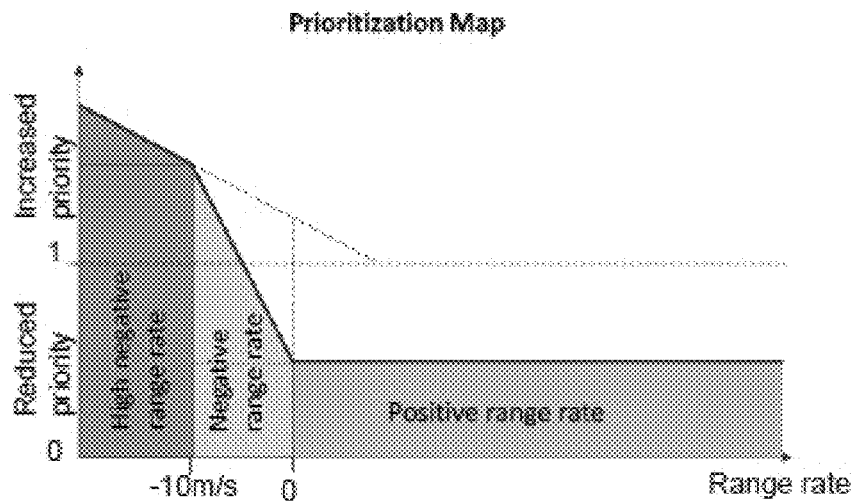
FIG. 6A shows a two-dimensional prioritization map for a use case of the disclosure relating to a left turn assist.
Figure 6B:
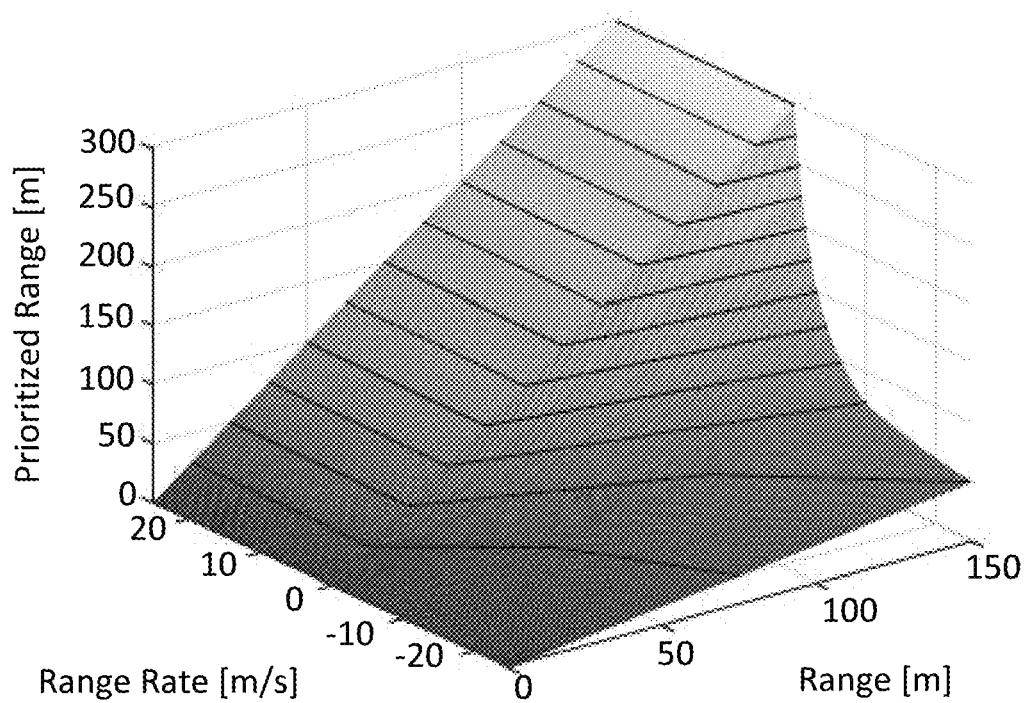
FIG. 6B shows the results of prioritization for the use case of FIG. 6A, wherein the prioritized range=range/prioritization map (range rate).

FIG. 6A shows a possible configuration of a prioritization map for this use-case. Oncoming remote vehicles 7 approaching the host vehicle 3 at high relative velocity are highly relevant for LTA. Therefore, the priority of remote vehicles 7 with a high negative range rate is highly increased. With a decreasing range rate, the priority is increased. Remote vehicles 7 approaching the host vehicle 3 at lower velocity in close distance to the host vehicle are relevant for LTA as well. Therefore, the priority of remote vehicles 7 with low negative range rate is increased Remote vehicles 7 moving away from the host vehicle 3 are not relevant for this use-case. For this reason, the priority of remote vehicles 7 with a positive range-rate is reduced.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for selecting data packages received by a host device, the method comprising:
   receiving, by the host device, a plurality of N data packages;
   for each data package of the N data packages, calculating a prioritized data package parameter, wherein the prioritized data package parameter for each data package is calculated from a ratio of a first data package associated parameter and a priority factor;
   sorting the data packages according to a predetermined sorting-scheme considering at least the prioritized data package parameters;
   down-selecting a number of M data packages from the N data packages, wherein M<N; and
   processing one or more of the down-selected M data packages.

2. The method according to claim 1, further comprising:
   for each of the N data packages, determining a priority rank based on the prioritized data package parameters; and
   sorting the data packages according to the predetermined sorting-scheme considering both the prioritized data package parameters and the priority ranks.

3. The method according to claim 1, wherein the data packages are transmitted to the host device from one or more remote device(s) by way of device-to-device (D2D) signal-transmission.

4. The method according to claim 3, wherein the host device is part of a host vehicle, and the one or more remote device(s) are part of remote vehicles or other remote objects.

5. The method according to claim 1, wherein the host device is part of a host vehicle, and wherein the data packages are transmitted to the host device by one or more sensing unit(s) of the host vehicle.

6. The method according to claim 1, wherein the priority factor is defined as a predefined function of a second data package associated parameter or a predefined function of a number of data package associated parameters, in particular a number of first or second data package associated parameters.

7. The method according to claim 1, wherein the data packages are sorted in an ascending or descending order with respect to the prioritized data package parameters or the priority ranks.

8. The method according to claim 1, wherein the M data packages with the highest or lowest prioritized data package parameters or priority ranks are down-selected.

9. The method according to claim 1, wherein the processing of the down-selected data packages is associated with transmitting one or more of the down-selected data packages from the host device to one or more receiving unit(s) and/or processing the down-selected data packages in the host device.

10. A method for selecting data packages received by a host device, the method comprising:
    receiving, by the host device, a plurality of N data packages;
    for each data package of the N data packages, calculating a prioritized data package parameter, wherein the prioritized data package parameter is a prioritized range between the host vehicle and a remote vehicle, wherein the prioritized range is calculated from a ratio of a range between the host vehicle and the remote vehicle as the first data package associated parameter and a predefined function of the range rate as second data package associated parameter;

sorting the data packages according to a predetermined sorting-scheme considering at least the prioritized data package parameters;

down-selecting a number of M data packages from the N data packages, wherein M<N; and processing one or more of the down-selected M data packages.

11. A system for selecting data packages comprising:
a host device of a host vehicle, the host device comprising a communication unit and a data processing unit, the host device configured to
  receive, by the host device, a plurality of N data packages;
  for each data package of the N data packages, calculate a prioritized data package parameter, wherein the prioritized data package parameter for each data package is calculated from a ratio of a first data package associated parameter and a priority factor;
  sort the data packages according to a predetermined sorting-scheme considering at least the prioritized data package parameters;
  down-select a number of M data packages from the N data packages, wherein M<N; and
  process one or more of the down-selected M data packages.

12. The system according to claim 11, wherein the host device is further configured to:
  for each of the N data packages, determine a priority rank based on the prioritized data package parameters; and
  sort the data packages according to a predetermined sorting-scheme considering the prioritized data package parameters and the priority ranks.

13. The system according to claim 12, wherein the data packages are transmitted to the host device from one or more remote device(s) by way of device-to-device (D2D) signal-transmission.

14. The system according to claim 13, wherein the host device is part of a host vehicle, and the one or more remote device(s) are part of remote vehicles or other remote objects.

15. The system according to claim 11, wherein the host device is part of a host vehicle, and wherein the data packages are transmitted to the host device by one or more sensing unit(s) of the host vehicle.

16. The system according to claim 11, wherein the priority factor is defined as a predefined function of a second data package associated parameter or a predefined function of a number of data package associated parameters, in particular a number of first or second data package associated parameters.

17. The system according to claim 11, wherein the data packages are sorted in an ascending or descending order with respect to the prioritized data package parameters or the priority ranks.

18. The system according to claim 11, wherein the M data packages with the highest or lowest prioritized data package parameters or priority ranks are down-selected.

19. The system according to claim 11, wherein the processing of the down-selected data packages is associated with transmitting one or more of the down-selected data packages from the host device to one or more receiving unit(s) and/or processing the down-selected data packages in the host device.

20. A system for selecting data packages comprising:
a host device of a host vehicle, the host device comprising a communication unit and a data processing unit, the host device configured to
  receive, by the host device, a plurality of N data packages;
  for each data package of the N data packages, calculate a prioritized data package parameter, wherein the prioritized data package parameter is a prioritized range between the host vehicle and remote vehicle, wherein the prioritized range is calculated from a ratio of a range between the host vehicle and the remote vehicle as the first data package associated parameter and a predefined function of the range rate as second data package associated parameter;
  sort the data packages according to a predetermined sorting-scheme considering at least the prioritized data package parameters;
  down-select a number of M data packages from the N data packages, wherein M<N; and
  process one or more of the down-selected M data packages.

* * * * *